P. HARRISON.
COTTON CHOPPER.
APPLICATION FILED FEB. 28, 1908.
909,294.
Patented Jan. 12, 1909.
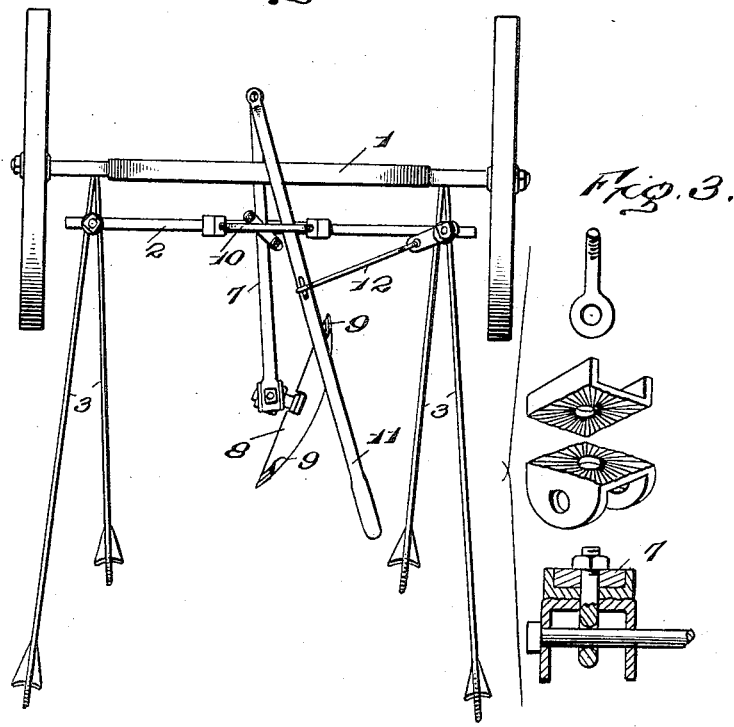
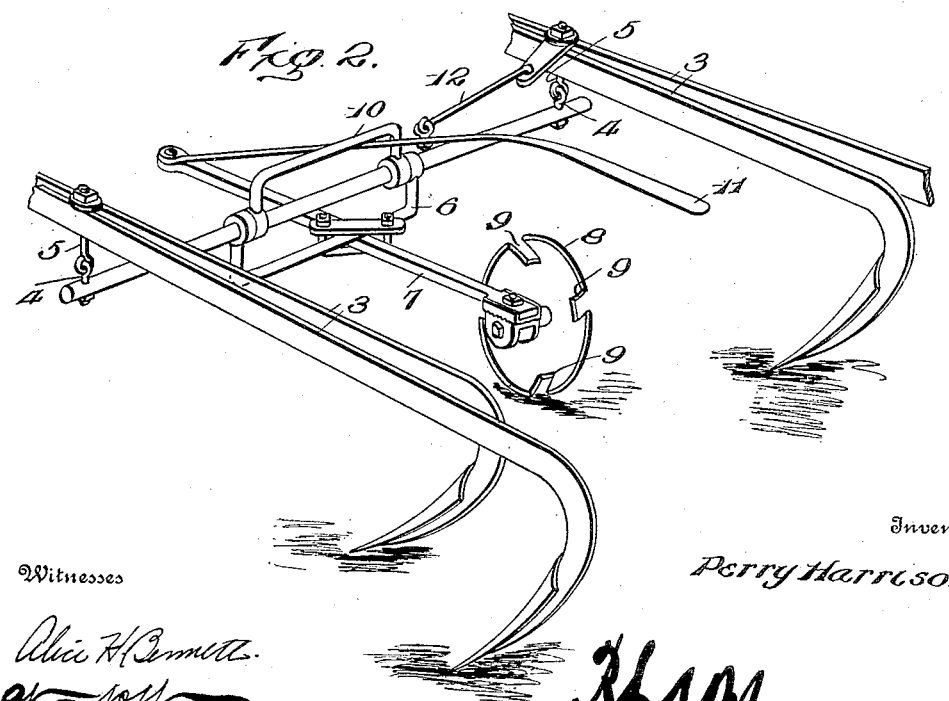
Witnesses
Inventor
Perry Harrison
Attorneys

UNITED STATES PATENT OFFICE.

PERRY HARRISON, OF NEAR CARNEGIE, OKLAHOMA.

COTTON-CHOPPER.

No. 909,294.     Specification of Letters Patent.     Patented Jan. 12, 1909.

Application filed February 28, 1908. Serial No. 418,333.

*To all whom it may concern:*

Be it known that I, PERRY HARRISON, citizen of the United States, residing near Carnegie, in the county of Caddo and State of Oklahoma, have invented certain new and useful Improvements in Cotton-Choppers, of which the following is a specification.

The present invention relates in general to agricultural implements and more particularly to a novel cotton chopper attachment which may be applied to any conventional form of cultivator and enables the operator to plow and chop the cotton at the same time.

The invention further contemplates novel means whereby the chopper may be moved from side to side so as to cause the same to operate effectively upon the cotton regardless of whether or not the cultivator to which the device is attached moves directly forward.

For a full description of the invention and the merits thereof and also to acquire a knowledge of the details of construction and the means for effecting the result, reference is to be had to the following description and accompanying drawings, in which:

Figure 1 is a top plan view showing the chopper attachment applied to a cultivator. Fig. 2 is a detail perspective view of the attachment showing a portion of the cultivator beams to which it is applied. Fig. 3 is a detail view of the members by means of which the chopper disk is attached to the beam.

Corresponding and like parts are referred to in the following description and indicated in all the views of the drawings by the same reference characters.

The invention is preferably in the nature of an attachment and may be applied to any suitable form of cultivator such as that indicated at 1. A transverse bar 2 connects the cultivator beams 3 and carries the chopper mechanism. In the present instance eye bolts 4 are applied to the extremities of the transverse bar 2 and loosely engage a second set of eye bolts 5 fitting between the forks at the front end of the cultivator beams. Slidably mounted upon the transverse bar 2 is a bracket 6 which is of approximately U formation and pendent therefrom, the arms of the bracket terminating in sleeves which loosely receive the transverse bar. A longitudinal beam 7 passes through the bracket 6 and is secured thereto at an intermediate point, the rear end of the said beam carrying a chopper disk 8 designed to operate just in front of the two inside cultivator shovels. This chopper disk is provided with boxing which rotates upon a horizontal axis, one end of which is fastened upon the concave side of the disk to the rear end of beam 7 with ratchet to change the angle of axis to relative position of said beam. The chopper disk 8 is designed to cut out the cotton plants and is provided in its periphery with a plurality of notches 9, those plants received within the notches being left standing, the distance apart of the cotton left standing being governed by the angle of the disk with respect to the direction of movement of the cultivator.

Projecting upwardly from the transverse bar 2 and over the bracket 6 is a keeper 10 through which extends an operating lever 11, the said keeper and bracket being connected with each other so as to slide together. In the present instance the keeper is provided at each end with a sleeve which loosely receives the transverse bar, the said sleeves being received between and bearing against the before mentioned sleeves of the bracket. The forward end of the operating lever 11 is loosely connected to the corresponding extremity of the longitudinal beam 7 and the said lever is pivoted upon a fulcrum member 12 secured to one of the cultivator beams 3 by means of a loose joint. It will thus be apparent that by swinging the operating lever laterally the bracket 6 can be moved longitudinally upon the transverse bar 2 and the chopper disk 8 shifted from side to side as may be required to cause the same to operate effectively upon the cotton row. It may also be mentioned that the bracket 6 has a pivotal connection with the transverse bar so that by moving the operating lever vertically the chopper disk 8 may be lifted away from the cotton plants and held in an inoperative position when desired. With this attachment as has been previously stated the operator is enabled to simultaneously plow and chop the cotton and means is provided for moving the chopper disk from side to side for the purpose of causing the same to travel accurately along the row of cotton plants in the required manner regardless of whether or not the draft animals cause the cultivator to deviate from side to side. The operating lever 11 also constitutes a means for enabling the chopper disk to be lifted into an inoperative position should the cotton plants be thin at any particular place.

Having thus described the invention, what is claimed as new is:

1. The combination of a cultivator, a transverse bar connecting the beams of the cultivator, a bracket slidably mounted upon the transverse bar, a beam rigidly connected to the bracket, a chopper member carried by the beam, and means for sliding the bracket upon the bar to move the chopper from side to side.

2. The combination of a cultivator, a transverse bar connecting the beams of the cultivator, a bracket slidably mounted upon the transverse bar, a beam rigidly connected to the bracket, a chopper member mounted upon the beam, a fulcrum member loosely connected to one of the beams of the cultivator, and a lever connected to the fulcrum member and also to the beam for sliding the bracket and moving the chopper member from side to side.

3. The combination of a cultivator, a transverse bar connecting the beams of the cultivator, a bracket slidably mounted upon the bar, a keeper loosely mounted upon the bar and slidable with the bracket, a beam rigidly connected to the bracket, a chopper member mounted upon the beam, a fulcrum member connected to the cultivator, and a lever passing loosely through the keeper and connected to the fulcrum member and the beam for sliding the bracket to move the chopper member from side to side.

4. The combination of a cultivator, a transverse bar upon the cultivator, a bracket slidably mounted upon the transverse bar, a beam rigidly connected to the bracket, a chopper member mounted upon the beam, means for adjusting the inclination of the chopper member, and means for sliding the bracket upon the bar to move the chopper member from side to side.

5. The combination of a cultivator, a transverse bar upon the cultivator, a bracket slidably mounted upon the transverse bar, a keeper loosely mounted upon the bar and slidable with the bracket, a beam rigidly secured at an intermediate point to the bracket, a chopper member at one end of the beam, a fulcrum member secured to the cultivator, and an operating lever passing loosely through the keeper, one end of the operating lever being loosely connected to the opposite end of the beam while an intermediate portion of the operating lever is connected to the fulcrum member.

In testimony whereof I affix my signature in presence of two witnesses.

PERRY HARRISON. [L. S.]

Witnesses:
    N. J. CUDDY,
    W. C. CAMPBELL.